Aug. 4, 1931.  T. J. CALHOUN  1,817,029

TANK NOZZLE FOR SWING JOINTS AND PIPE LINE CONNECTIONS

Filed Feb. 2, 1927

INVENTOR.
Tracy J. Calhoun.
BY
Pay, Oberlin & Day
ATTORNEYS.

Patented Aug. 4, 1931

1,817,029

UNITED STATES PATENT OFFICE

TRACY J. CALHOUN, OF CLEVELAND, OHIO, ASSIGNOR TO THE OIL CONSERVATION ENGINEERING COMPANY, OF CLEVELAND, OHIO, A CORPORATION OF OHIO

TANK NOZZLE FOR SWING JOINTS AND PIPE LINE CONNECTIONS

Application filed February 2, 1927. Serial No. 165,394.

The present invention relates to tank nozzles for use as the tank wall connection between the exterior pipe line, and the interiorly mounted swing lines and joint therefor. The present nozzle provides a flange for attachment to the pipe connection spaced from the tank wall sufficiently to allow the pipe connection to be easily made and provides a construction for engagement with the tank wall which can be made tight. The portion provided for connecting to the swing pipe joint is so formed as to bring such joint close to the wall structure. To the accomplishment of the foregoing and related ends, said invention, then consists of the means hereinafter fully described and particularly pointed out in the claim.

The annexed drawings and the following description set forth in detail certain mechanism embodying the invention, such disclosed means constituting, however, but one of various mechanical forms in which the principle of the invention may be used.

Figure 1:
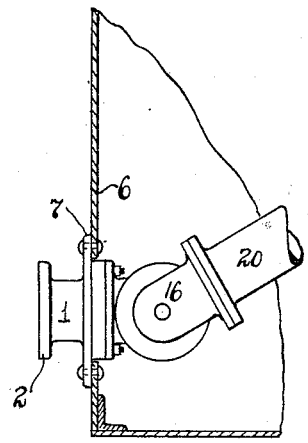
Figure 2:
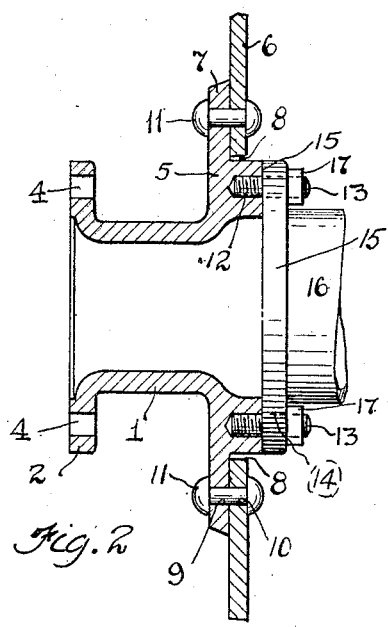
Figure 3:
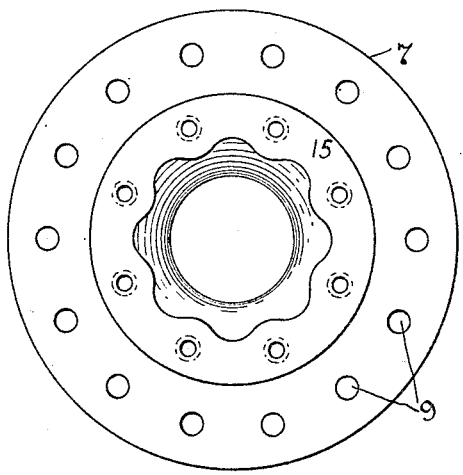

In said annexed drawings:

Fig. 1 is an elevational view showing a tank wall with the nozzle and swing line mounted thereon; Fig. 2 is a vertical longitudinal section through the nozzle and tank wall; and Fig. 3 is an end elevational view of the nozzle.

The present coupling or nozzle is preferably a casting which provides a pipe portion 1 having an apertured flange 2 at its outer end for engagement with the complementary flanged end of the pipe line to which it is secured by bolts passing through the aligned apertures 4 in the flange 2.

At the other end the nozzle is provided with a heavy connecting flange 5 of sufficient length to extend through the tank wall 6. Around flange 5 and formed integrally therewith is an enlarged collar or ring 7 adapted to contact with the wall 6 of the tank around the opening 8 through which the flange 5 extends. This collar 7 is provided with a series of spaced holes 9 which align with complementary holes 10 in the tank wall to receive rivets 11 which hold the nozzle securely in place. The joint between the collar and tank wall is calked or sealed in the usual manner.

In the interior face 15 of flange 5 are a series of spaced threaded apertures 12 in which are mounted studs 13, and these studs are passed through the complementary holes 14 in the flange 15 of the usual swing pipe joint 16 which fits snugly against the face 15 of flange 5 and which is held in place by the nut 17.

By the present construction the connection between the swing pipe joint 16 and the nozzle is held as close to the wall 6 as possible thus reducing the strain placed upon the wall by the heavy swing pipe 20. The nozzle is an integral casting and provides easy connection with the exterior pipe and a safe tight joint with the tank wall and at the same time a close up pivotal connection for the swing line.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:

A tank nozzle for swing joints and tank lines consisting of a casting having a heavy interior flange adapted to extend through the tank wall and having spaced tapped apertures on its inner surface, studs mounted in said apertures for engagement with a swing joint, said casting having an annular collar extending from said flange and adapted to engage the tank wall, and said casting having an outwardly extending portion provided with an apertured flange for engagement with a line pipe.

Signed by me this 27th day of January, 1927.

TRACY J. CALHOUN.